Aug. 18, 1959 H. G. LUBSZYNSKI ET AL 2,900,280

FORMATION OF LAYERS OF PHOTO-CONDUCTIVE MATERIALS

Filed July 16, 1956

Inventors
H. G. Lubszynski
J. Wardley
By Glascock Downing & Seebold
Attys

United States Patent Office 2,900,280
Patented Aug. 18, 1959

2,900,280

FORMATION OF LAYERS OF PHOTO-CONDUCTIVE MATERIALS

Hans Gerhard Lubszynski, St. Lawrence, and John Wardley, Hounslow, England, assignors to Electric & Musical Industries Limited, Hayes, Middlesex, England, a company of Great Britain Application July 16, 1956, Serial No. 598,029

Claims priority, application Great Britain July 23, 1955

19 Claims. (Cl. 117—215)

Figure 1:
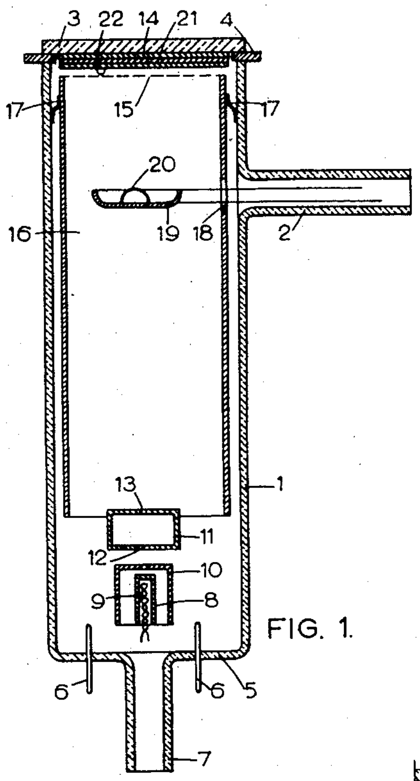

The present invention relates to an improved method of forming composite layers of photo-conductive materials on surfaces such as can be employed in photo-sensitive devices for example television pick-up tubes.

A very important factor of photo-conductive layers for television pick-up tubes is the photo-conductive lag of the layer which in general with normal layers is found to be undesirably high. It is also desirable that such layers should have a high sensitivity and a good overall colour response.

It has already been proposed to form a photosensitive device in which a photo-conductive layer of antimony tri-sulphide is deposited on a support by evaporating the material in a gas so that the deposited layer has a porous or spongy nature. The advantage of such a layer is that it has a low capacitance and a short photo-conductive lag. However it has the disadvantage of poor sensitivity, about 30$\mu$ amps. per lumen and a low colour response at the red end of the spectrum.

The measurement of sensitivity given above and that which follows in the specification are based on an illumination incident on the layer of about 1.5 ft. candles and a target voltage such that in the dark there flows a current of approximately 0.01 to 0.02$\mu$ amps. square cm. of target area. The size of the scanned area in this example was ⅜" by ½".

The formation of such layers is highly critical and only slight changes in the steps in the method employed in their formation can change the composition and nature of the layer such that a vast difference in the performance of the layer in respect of lag, sensitivity, or colour response can occur.

It is an object of the present invention to provide an improved method of forming composite layers of photo-conductive materials having a high sensitivity and a low photo-conductive lag.

According to one feature of the invention there is provided a method of forming a composite layer of photo-conductive material on a surface of a support comprising evaporating on said surface by evaporation of said material in a gas atmosphere to form a spongy layer on said surface, heating said layer after deposition thereof to such a temperature and for such a period of time to increase the sensitivity of said layer and then evaporating a layer of a photo-conductive material in vacuo so as to provide a solid layer on said spongy layer.

The heating of the spongy layer when the latter is composed of antimony trisulphide is performed at a temperature not exceeding 200° C. for a period of time to produce the required sensitivity for example at a temperature of 140° to 200° C. for a period of 15 minutes.

The spongy and solid layers forming the composite layer may be of the same, or of different photo-conductive substances.

According to another feature of the invention there is provided a method of forming a spongy layer of photo-conductive material on a surface in a container by evaporation in a gas from a heated evaporator wherein during said evaporation the whole of the container is also heated so as to promote a more effective distribution of convection circulation in the gas.

The temperature at which the container is heated will depend to some extent on the gas employed, but with the evaporator at a temperature of 400–450° C. it will usually be found that subjecting the container to a baking temperature of from 50–80° C. will cause effective circulation of the gas therein.

Figure 2:
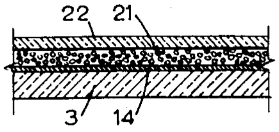

In order that the invention may be clearly understood and readily carried into effect, an embodiment thereof shown applied to the construction of a television pick-up tube will now be described with reference to the accompanying drawing, in which:

Figure 1 illustrates a sectional view of one form of such a tube embodying a photo-sensitive layer according to the invention, and Figure 2 is an enlarged view of a portion of this layer.

Referring to Figure 1 there is shown a tubular glass envelope 1 having a side tube 2 and at one end an optical window 3 hermetically sealed to the envelope 1 via a metal ring 4 said window 3 being of 2 mms. thickness and having an internal diameter of 20 mms. and forming as described later, the support for a photo-sensitive layer. At the other end of the envelope 1 there is provided a glass base 5 having metal contact members 6 hermetically sealed therethrough and arranged as a circular array around a pump stem 7. Supported from the members 6 within the envelope is an electron gun which as shown comprises a thermionic cathode 8 with its associated heating element 9 an apertured grid electrode 10 which during operation of the tube may be maintained at a negative potential of 0–100 volts with respect to cathode 8. The grid 10 is followed by an anode electrode 11 said anode 11 having spaced apart apertures 12, 13 of different diameters to reduce the lateral components of the beam of electrons generated by the cathode 8 in known manner and which during operation of the tube may be maintained at a potential of 300 volts positive with respect to cathode 8. The inner surface of the window 3 is provided with a substantially transparent electrically conducting coating 14 preferably by spraying over the surface of the window whilst hot a solution of tin salt said coating 14 being electrically connected to the ring 4 and serving during operation of the tube as a signal electrode and to which is applied a potential which may be up to 150 volts positive with respect to the operating potential of the cathode 8 which in a low velocity tube is maintained at zero volts.

Adjacent to and facing the coating 14 but at a slight distance for example 2.5 mms. therefrom there is provided a metal mesh electrode 15 carried by a metal cylinder 16 having means 17 for locating it within the envelope 1 and an aperture 18 arranged to coincide with the side tube 2. The mesh 15 functions in the operation of the tube as an ion trap and is maintained at the same potential as the cylinder 16 which extends over a considerable area of the internal wall of the envelope 1 and functions as an anode electrode by being connected to a positive potential of for example 280 volts with respect to the cathode 8.

An evaporator boat 19 containing a quantity of e.g. 4–10 milligrammes of photo-conductive material 20 such as antimony trisulphide and provided with suitable means for heating it to cause evaporation of the material 20 is housed in the side tube 2. The tube so formed is then given a degassing bake to degas the whole of the envelope 1, the gun electrodes 8, 10, 11 and anode 16 such degassing bake being effected for example at a temperature of 300–350° C. the envelope being continuously pumped. On completion of degassing the boat 19 is passed through the aperture 18 so that it is positioned as shown in Figure 1, with its open side facing the mesh 15 and at a distance of 17 mms. from the conductive coating 14.

With the side tube 2 closed, the envelope 1 is filled with a suitable gas such as xenon, argon, nitrogen, air etc., at a suitable pressure. The optimum gas pressure will vary with the particular gas used but with xenon a pressure of approximately 0.4 mm. Hg is suitable; for argon, the pressure should be approximately 0.7 to 1.5 mm. Hg. The whole envelope of the tube is now immersed in an oven so as to raise the temperature of the device to for example from 50° C. to 80° C. and the boat 19 containing the antimony trisulphide is then heated to for example a temperature of 400–450° C. by passing an electric current through it until the whole of the material is evaporated. The antimony trisulphide will thus deposit through the mesh 15 to form a porous or spongy base layer 21 over the coating 14. During this evaporation only part of said material will deposit on the coating 14, part of it being deposited on the bars of the mesh 15 and the remainder on the inside surface of the tubular wall of the cylindrical anode 16 over a band about 1 inch wide and approximately symmetrical to the plane of the evaporator boat 19 and normal to the axis of the envelope 1.

Heating the whole of the envelope 1 during the evaporation promotes an improved convection circulation of the gas which provides a much greater control over the deposited layer 21 in respect of the uniformity and also thickness. The layer 21 so formed differs quite considerably from that provided when only the window 3 of the tube is heated in that it permits, due to the circulation of the gas by this manner even quite large particles to be deposited which it is found are not deposited when only the window 3 is heated. It is thought that when the window 3 only is heated a stagnant gas barrier is set up between the evaporator 19 and the coating 14 which causes the interstices of the mesh 15 to become clogged with material before a sufficient thickness of layer is deposited on the surface 14. It should be mentioned that the temperature of the bake during this deposition should not reach the temperature at which the layer is substantially transformer into a black crystalline structure i.e. it should not exceed 200° C. and although 70° C. has been found to be a suitable temperature when xenon is the gas employed, this temperature may extend over a range between 30 and 160° C. the main consideration being to promote a good circulation of the gas during the evaporation.

After formation of the spongy layer 21 in the above manner the boat 19 is removed, the side tube 2 sealed off and envelope 1 is evacuated via stem 7. The layer 21 is now baked at a temperature of for example 140° C. to 200° C. for a period of 15 minutes. This baking process is somewhat critical and although the foregoing time and temperature has been found to be highly satisfactory in practice, the same effect may well be obtained by baking at a slightly lower temperature for a slightly longer period, but care must always be taken that the temperature is not so high e.g. above 200° C. that a change in the layer to the black crystalline form occurs.

To complete the layer the anode 16 and mesh 15 are inductively heated so as to re-evaporate the material from the anode 16 and mesh 15 and deposit it as a solid layer 22 on the spongy base layer 21. During this latter evaporation the temperature of the mesh 15 and anode 16 will be about 400 to 450° C. and will cause some heating of the layer 21. Care must be taken that the temperature of the layer 21 is not excessive or a detrimental change in the structure of the layer may occur. Although it is difficult to define the exact temperature that the layer 21 attains during deposition of the layer 22 it is found that with a glass window of 2 mms. thickness a temperature gradient can be set up therethrough which prevents a detrimental change in the nature of layer 21, by cooling the outer surface of the window 3. This cooling may be achieved by applying cold water or a cool air blast to the outer surface of the window 3. The pump stem 7 is then sealed off.

It will be understood that in utilising a tube as above described the various potentials already mentioned will be applied to the electrodes and the cathode heated to its electron emitting temperature. A light image will be projected through the window 3 onto the sensitive surface formed by the layers 21 and 22. Externally of the tube there will be provided magnetic focussing means for forming the electrons from the gun into a well defined beam and magnetic means for scanning the electron beam in an orthogonal manner over the surface of the layer 22. The scanning beam has a low velocity and therefore reduces the positive charges which will be set up on the gun side of the layer 22 to a datum potential at or near that of the cathode 8 of the tube and causes signal currents to flow to the signal electrode layer 14.

The composite photo-conductive layer formed by the method as described gives the surprising result of providing a layer having a capacitance lag which is considerably smaller than a spongy layer alone and has a very good overall colour response particularly at the red end of the spectrum, and has a very high sensitivity. Measurements with tubes made according to the method of the invention show that sensitivities of 75$\mu$ amps./lumen with an incident light of 1.5 ft. candles and with a voltage across the layer producing a dark current of .01$\mu$A square cm. are easily obtained.

Although the reasons for the improvement in lag with a composite layer according to the invention is not fully understood it is believed that the partial sintering which occurs on heating the layer 21 bonds the particles of this layer closer together whereby the gaps between the particles become smaller such that the solid layer more completely covers these gaps so that the effective depth of penetration of the scanning electrons is reduced thereby reducing the effective capacitance of the layer.

Antimony tri-sulphide has been mentioned only by way of example and it will be understood that other photo-conductive materials such as zinc selenide, cadmium sulphide, cadmium selenide, or germanium sulphide may be employed to furnish either the spongy or solid layer or both, to form the composite layer in accordance with the invention.

Although the invention has been described as applied to the construction of a pick-up tube which is very suitable for operation with low velocity scanning, the invention is also applicable to pick-up tubes adapted to operate with high velocity scanning and generally to devices having a photo-sensitive layer formed of a photoconductive material.

What we claim is:

1. A method of forming a composite layer of photoconductive material on the surface of a support comprising evaporating said material on said surface by evaporation of said material in a gas atmosphere to form a spongy layer on said surface heating said layer after deposition thereof to such a temperature and for such a period of time to increase the sensitivity of said layer, and then evaporating a layer of a photo-conductive material in vacuo so as to provide a solid layer on said spongy layer.

2. A method according to claim 1 wherein the photoconductive material for said spongy layer and for said solid layer is antimony tri-sulphide.

3. A method according to claim 1 wherein said spongy layer is heated in the temperature range of 140–200° C. for 15 minutes.

4. A method according to claim 1 wherein the heating of said spongy layer is carried out in vacuo.

5. A method of forming a composite layer of photo-conducting material on a light translucent support comprising evaporating said material on a surface of said support by evaporation of said material in a gas atmosphere to form a spongy layer on said surface, heating said layer after deposition thereof to such a temperature and for such a period of time to increase the sensitivity of said layer and then evaporating a layer of a photo-conductive material in vacuo to deposit a solid layer on the surface of said spongy layer which is remote from said support.

6. A method according to claim 5 wherein the photo-conductive material for said spongy layer and for said solid layer is antimony tri-sulphide.

7. A method according to claim 5 wherein said spongy layer is heated in the temperature range of 140–200° C. for 15 minutes.

8. A method according to claim 5 wherein the heating of said spongy layer is carried out in vacuo.

9. A method of forming a composite layer of photo-conducting material on the surface of a support comprising evaporating said material on said surface by evaporation of said material in a gas atmosphere to form a spongy layer on said surface, heating said layer after deposition thereof to such a temperature and for such a period of time to increase the sensitivity of said layer, cooling said layer and then evaporating a layer of a photo-conductive material so as to provide a solid layer of said material on said spongy layer and maintaining said layer cooled throughout the deposition of said solid layer.

10. A method of forming a spongy layer of a photo-conductive material on a surface in a container comprising mounting said evaporator containing said material within said container so as to be spaced from but facing said surface, heating said evaporator to the evaporation temperature of said material in the presence of a gas and at the same time setting up a zone of heat surrounding the space from said evaporator to said surface from a source of heat different from said evaporator to promote a more effective convection circulation of the gas than could be provided by said heated evaporator alone.

11. A method of forming a spongy layer of photo conductive material on a surface in a container by evaporation of said material in a gas from a heated evaporator, comprising heating the container during said evaporation from a heating source other than said heated evaporator to thereby provide a more effective distribution of convection circulation of said gas than could be obtained with said heated evaporator alone.

12. A method of forming a photo conductive device having within the envelope of said device an electrically conducting light translucent surface and a metal member, comprising evaporating a photo conductive material in a gas to cause said material to deposit as a spongy layer on said surface and said metal member, heating the layer on said surface at such a temperature and for such a period of time until an increase in the sensitivity of said layer occurs and thereafter heating said metal member in vacuo to evaporate the photo-conductive material deposited thereon to cause said material to deposit as a solid layer on said spongy layer.

13. A method according to claim 12 wherein said photo-conductive material is antimony tri-sulphide.

14. A method according to claim 12 wherein the photo-conductive material for said spongy layer and for said solid layer is antimony tri-sulphide.

15. A method according to claim 12 wherein said spongy layer is heated in the temperature range of 140–200° C. for 15 minutes.

16. A method according to claim 12 wherein the heating of said spongy layer is carried out in vacuo.

17. A method of forming a photo conductive target comprising a supporting surface for said target evaporating a photo-conductive material in a gas to deposit a layer of said material on said surface in a spongy form thereafter heating said spongy layer at such a temperature and for such a time until an increase in the sensitivity of said layer occurs and then evaporating a photo conductive material in vacuo to deposit a solid layer of photo conductive material on said spongy layer.

18. A method of forming the photo conductive target of a charge storage pick-up tube comprising within an envelope a surface and adjacent said surface a metal mesh electrode, and an evaporator containing a photo conductive material facing said mesh on the side thereof remote from said surface, the steps of heating said evaporator in the presence of a gas to deposit said photo-conductive material in spongy form on and through said mesh and over said surface as a layer, heating the layer on said surface at such a temperature and for such a time until an increase in the sensitivity of said layer occurs and thereafter heating said mesh in vacuo to evaporate the photo-conductive material deposited thereon to cause said material to deposit as a solid layer on said spongy layer.

19. A photo-conductive device having a target composed of an evaporated layer of photo-conductive material in spongy form in which the structure of said layer has been modified by the effect of a heat treatment after its deposition and having an evaporated solid layer of a photo-conductive material on said modified spongy layer.

References Cited in the file of this patent

UNITED STATES PATENTS

| | | |
|---|---|---|
| 2,525,768 | Bruns | Oct. 17, 1950 |
| 2,574,356 | Sommer | Nov. 6, 1951 |
| 2,654,852 | Goodrich | Oct. 6, 1953 |
| 2,710,813 | Forgue | June 14, 1955 |
| 2,739,079 | Keck | Mar. 20, 1956 |
| 2,739,243 | Sheldon | Mar. 20, 1956 |
| 2,744,837 | Forgue | May 8, 1956 |
| 2,745,032 | Forgue et al. | May 8, 1956 |

FOREIGN PATENTS

| | | |
|---|---|---|
| 749,601 | Great Britain | May 30, 1956 |